June 14, 1960 G. N. WILLIS 2,941,054

CODED-CARD READER

Filed Aug. 6, 1958 3 Sheets-Sheet 1

INVENTOR.
GRANT N. WILLIS
BY John Todd
ATTORNEY

June 14, 1960 G. N. WILLIS 2,941,054

CODED-CARD READER

Filed Aug. 6, 1958 3 Sheets-Sheet 2

INVENTOR.
GRANT N. WILLIS
BY John Todd
ATTORNEY

June 14, 1960 G. N. WILLIS 2,941,054

CODED-CARD READER

Filed Aug. 6, 1958 3 Sheets-Sheet 3

INVENTOR.
GRANT N. WILLIS

BY John Todd

ATTORNEY

United States Patent Office 2,941,054

Patented June 14, 1960

2,941,054

CODED-CARD READER

Grant N. Willis, Bristol, Conn., assignor, by mesne assignments, to United-Carr Fastener Corporation, Boston, Mass., a corporation of Delaware Filed Aug. 6, 1958, Ser. No. 753,475

12 Claims. (Cl. 200—46)

Figure 1:
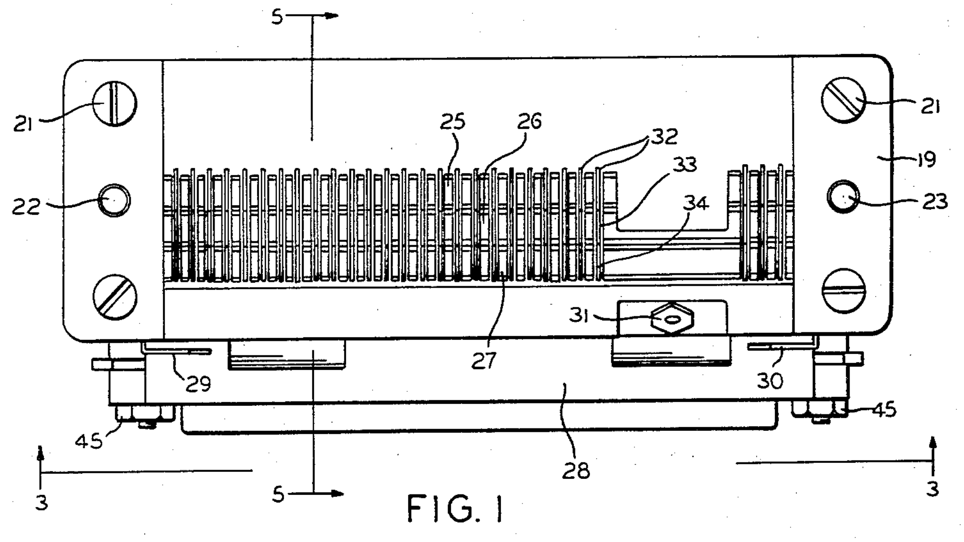

This invention relates to a multiple-contact connector, and more especially to a reader or deciphering apparatus having utility in one exemplification as a reader for coded cards as, for example, one having a conductive pattern thereon whereby interconnections are provided from selected terminations on the reader to predetermined points on the conductive pattern.

While there are various environments in which the multiple-contact connector has utility, a specific example thereof is its use in conjunction with a subscriber television network. In this setting, it will function as a reader of coded cards which may have a program listing printed on one side thereof and a metallic conductive pattern imposed on the reverse side which corresponds with the program listing. The subscriber will be supplied with cards, each of which will cover a predetermined time period; and to select a program, he will simply insert the card into the reader and align the desired program with indexing indicia on the reader. The reader may either be an integral part of the television receiver or an attachment for use therewith, and will establish connection with the appropriate portions of the metallic pattern which correspond to the selected program. It will be apparent that an electronic decoder or unscrambler must be operatively associated with the reader, for the transmitted television program (that is, the video and audio signals) will be accompanied by an interference signal to prevent intelligent reception of the program except by the subscribers therefor. The instant invention is concerned with the reader per se, and not with the electrical apparatus which necessarily will be used therewith.

An object of the present invention is to provide a multiple-contact connector which may be employed as a coded card reader adapted for use as described above. Another object of the invention is in the provision of reader apparatus characterized by affording permanent or fixed connections with any electrical apparatus to be used therewith. Still another object is that of providing a reader which will establish good electrical connection with the metallic pattern on a coded card, but will not unduly wear off the pattern (which is relatively thin by reason of economic necessity) during repeated insertion and removal of the card from the reader.

Yet another object is to provide a reader with contact fingers which will make a brush-type contact with the metallic pattern, which exert a contact pressure of a relatively small, predetermined magnitude upon the pattern, and which will neither destroy the pattern nor be damaged themselves if the card is incorrectly inserted.

A further object is that of providing reader apparatus for making point connections with a printed metallic pattern on a coded card, and which comprises multiple rows of small contact fingers electrically isolated from each other, but which are individually connected with the conductors of a printed wire panel—the reader being a small, compact unit of simplified construction susceptible to practicable fabrication in accordance with mass production techniques. Additional objects and advantages of the invention will become apparent as the specification develops.

Figure 2:
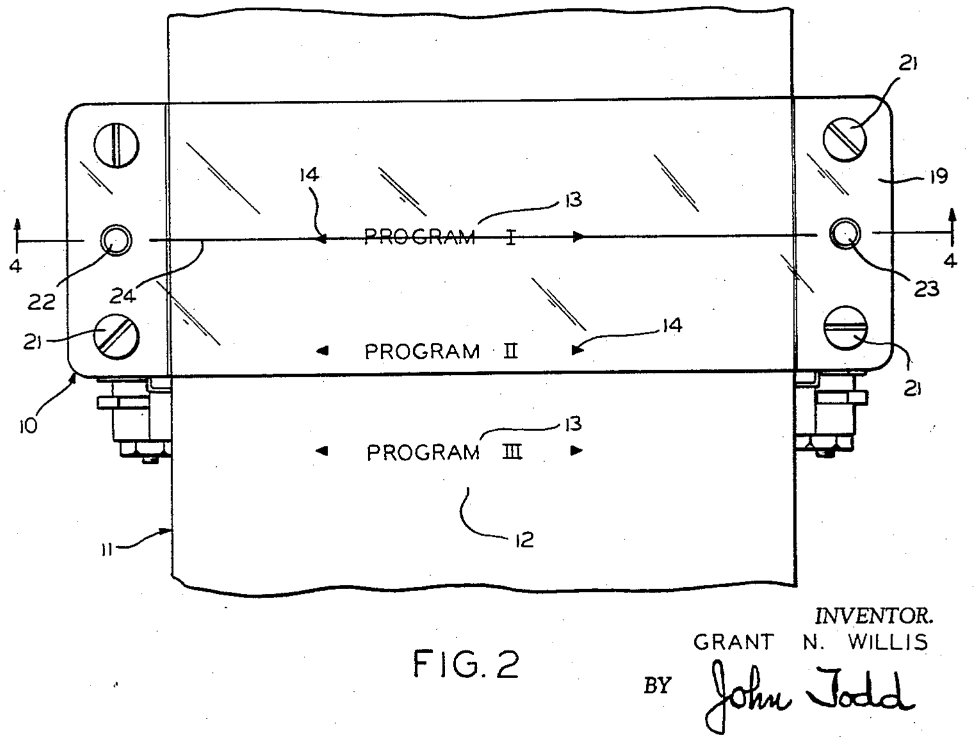
Figure 3:
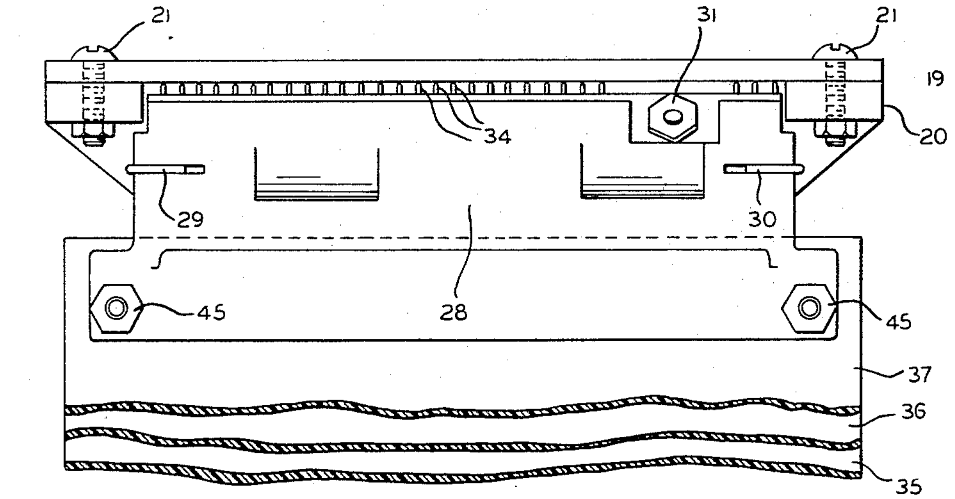
Figure 7:
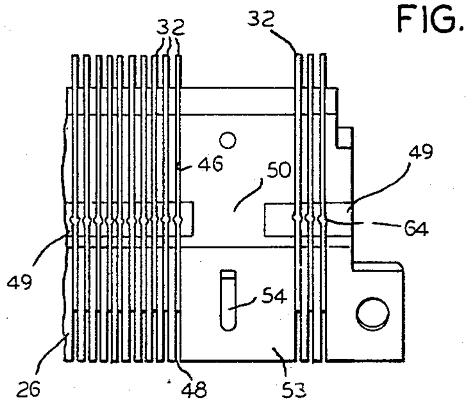
Figure 8:
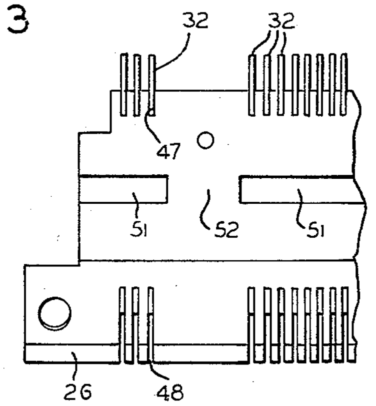
Figure 4:
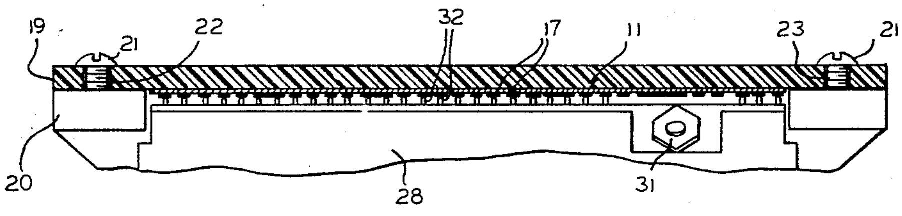
Figure 5:
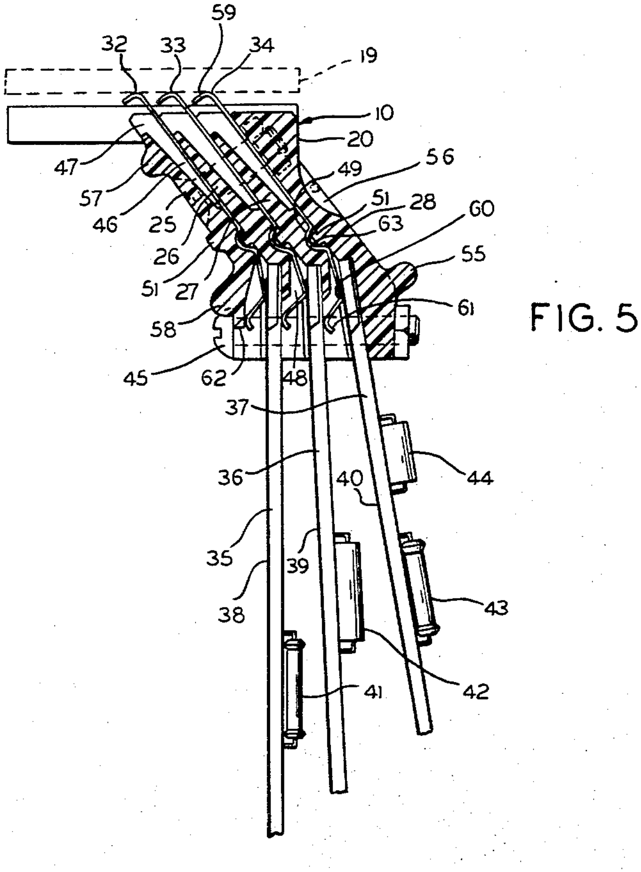
Figure 6:
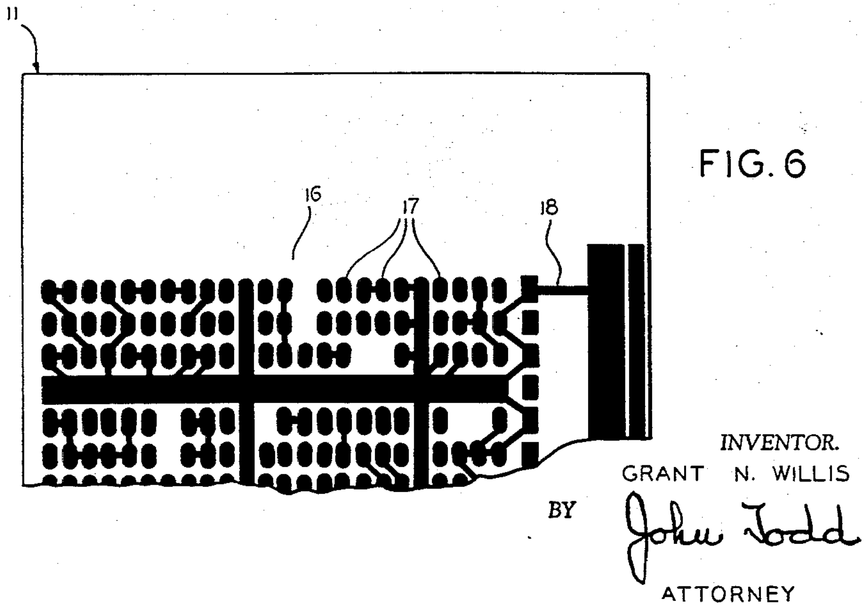

An embodiment of the invention is illustrated in the accompanying drawings, in which:

Figure 1 is a top plan view of a reader embodying the invention; Figure 2 is a top plan view similar to that of Figure 1, but showing a coded card in position with the reader; Figure 3 is a side view in elevation taken generally along the line 3—3 of Figure 1; Figure 4 is a broken, longitudinal sectional view taken generally along the line 4—4 of Figure 2, but in which parts of the apparatus are shown in elevation; Figure 5 is a transverse sectional view of the apparatus taken generally along the line 5—5 of Figure 1; Figure 6 is a broken plan view of the bottom or underside of the coded card illustrated in Figure 2; Figure 7 is a broken top plan view of a contact block; and Figure 8 is a broken bottom plan view of the block.

Figure 2 illustrates the combination of the reader apparatus and coded card which are designated, respectively, with the numerals 10 and 11. In the exemplary card shown, the face thereof has a program listing printed thereon, which comprises essentially a vertically arranged row 12 of separate programs 13. Along each program 13 is an indicia or locator mark 14 which may be used in properly aligning the card in the reader, as described more fully hereinafter. If reference is made to Figure 6, it will be seen that the reverse side of the card 11 has a metallic or conductive pattern 16 provided thereon, which is comprised of a plurality of individual point conductors or separated contacts 17, certain of which may be interconnected by conductors 18.

The card 11 may be formed of paper or other electric insulating material for the specific illustration of pattern 16. The card 11 may be about the thickness of a postcard, and the pattern may be conveniently printed thereon. Similarly, the program listing on the face of the card may be printed. The various conductors of the pattern 16 will be arranged so as to establish connection with at least certain of the contact fingers provided by the reader 10, as will be described hereinafter, and are oriented in such a manner that when the card is properly inserted into the reader and the selected program aligned with the indicia provided thereby, reception of the subscribed program will be effectuated.

The reader 10 in the specific arrangement shown in the drawings is equipped with a transparent panel 19 that may be formed of plexiglass or other suitable material, and which is affixed to a frame 20 by a plurality of nut and bolt assemblies 21. To facilitate proper positioning of the transparent panel on the frame, the panel may be formed with apertures therein adapted to receive alignment pins 22 and 23 provided by the frame. An exemplary indexing arrangement is provided by the panel 19, and is in the form of a line 24 extending longitudinally thereacross with which the selected program on the front of the card 11 may be aligned. It will be appreciated that other indexing arrangements may be employed, and the only requisite is that it define a predetermined relationship between the contact fingers of the reader and the appropriate conductors in the pattern 16, when the selected programs are related thereto.

The frame 20 is comprised of a plurality of contact or terminal blocks 25, 26 and 27 and cover plate 28 that may be held in juxtapostion by U-shaped clips 29 and 30 and/or by a nut and bolt assembly 31. The block 25 is equipped with a plurality of contact fingers 32 that define a row extending longitudinally thereacross; and similarly, the blocks 26 and 27 have rows of contact fingers 33 and 34. The contacts 32 through 34 are all identical; and in the specific illustration, each of the rows has twenty-eight contacts so that there are a total of eighty-four in the reader.

Interconnected with the contact blocks, and more importantly with the fingers thereof, are printed wire circuit panels 35, 36 and 37, each of which is equipped along at least one side thereof with printed conductors 38, 39 and 40, respectively. The various conductors will establish contact with the fingers 32 through 34 by frictional engagement therewith. It will be apparent that the panels may have circuit elements 41 through 44 mounted thereon which, of course, are connected to the various printed conductors. The panels are slidable into the position of interengagement with the various contact fingers, as shown in Figure 5; and if desired, nut and bolt assemblies 45 may extend through the blocks 25 through 28 for the purpose of clamping the same together adjacent the panels to lock the same in position. Preferably, the panels will have recesses formed therein so that they can be released from the reader simply by loosening the bolts 45 rather than by removing the same.

The blocks 25 through 27 are substantially identical, and as is evident from Figures 5, 7 and 8 each block has a plurality of channels 46 that extend transversely thereacross and are oriented in parallel relation along one side of the panel. The channels terminate at each end thereof in open slots 47 and 48, and each channel has a contact finger positioned therein. Extending across the channels 46 is an elongated recess 49 that is interrupted at a point off-center thereof as shown at 50. Extending longitudinally across the other face of the block is a rib 51, which is parallel to the recess 49 and is also interrupted as shown at 52. The rib 51 while parallel to the recess 49, is offset therefrom in the direction of the slotted ends 47 of the channels. The rib of one block is adapted to seat within the recess of the block adjacent thereto as shown in Figure 5, and the interrupted areas of both the recesses and ribs serve to polarize or orient the blocks in a longitudinal sense with respect to each other.

The blocks each have a laterally turned longitudinal edge portion 53 along the slotted ends 48 of the channels, and such turned edge portions may be equipped with a spacer 54 in general alignment with the interrupted area 50 of the recess 49, which serves to impose a condition of separation upon the facing end portions of contiguous blocks. It may also be noted by referring to Figure 5 that the adjacent faces of the end portions 53 of the blocks 25 and 26 are substantially parallel and are disposed along a plane generally normal to the indexing plate 19. On the other hand, the adjacent faces of the turned end portions of blocks 26 and 27 while parallel are disposed in planes defining an angular relation with the indexing panel 19. The corresponding faces of the block 27 and cover block 28 are also parallel, but are disposed at an even greater angle with respect to the indexing plate. As a consequence, the printed panels 35, 36 and 37 which are disposed between the respectively paired blocks diverge outwardly from each other (as Figure 5 makes evident) so as to afford sufficient space between the panels to permit the mounting of circuit elements such as 41 through 44 thereon, while at the same time defining a compact, close-together disposition at their connection with the contact blocks.

The cover block 28 is very similar to the blocks 25 through 27, except that it need not be provided with slotted channels 46 along the outer face thereof; and if desired, may have a finishing rib 55 extending across such surface and dished areas 56 also provided therealong. While the undersurface of the contact block 25 may be identical with those of the blocks 26 and 27, it may have enlarged finishing ribs 57 and 58 extending thereacross.

The contacts 32 through 34 are elongated elements that have a turned or curved end portion 59 that extends outwardly beyond the slotted end 47 of the channels 46. Normally, these turned ends 59 are in abutment with the undersurface of the indexing panel 19; and when a coded card 11 has been inserted beneath the panel, the contact end portions engage the conductors 17 thereon as shown in Figure 4. Adjacent the opposite ends, the contacts are turned laterally to define a friction knee 60 that engages and thereby makes electrical connection with the printed conductors on the various circuit panels 35 through 37. Outwardly of the friction knee 60, each contact has a slightly arcuate end 61 that rides on the upper surface of the adjacent printed circuit panel and thereby resiliently urges the friction knee thereof into tight engagement with the printed conductors of the next panel.

Thus, the turned end 61 of each contact 34 rides on the printed circuit panel 36 and biases the friction knee into engagement with the conductors of the panel 37. Similarly, the end 61 of each contact 33 rides on the panel 35 and biases the friction knee against the conductors of panel 36. In the case of the turned ends 61 of the contacts 32, there is no printed circuit panel on which it may ride, and therefore the contact block 25 has a projecting edge portion 62 against which the turned ends can bear and thereby resiliently urge the friction knees against the conductors of panel 35.

Each contact intermediate the ends thereof has a bowed portion 63 that seats within the recess 49. The contacts for convenience in assembling the contact fingers, etc., are locked within the channels therefor prior to the assembly of the blocks. This locking is accomplished in a staking operation, wherein a heated punch is pressed down against the bowed portion 63 of the contact after the insertion thereof into the appropriate groove to melt a small amount of the block material within the recess, whereupon the bowed portion of the contact is pressed thereinto and is thereafter held in such position when the material again solidifies. The contacts after such securance thereof to the blocks is shown in Figure 7, and for identification the staked areas confining the contacts are denoted with the numeral 64.

The material comprising the contact blocks and cover block is preferably a thermoplastic, such as acrylonitrile-methylstyrene which has excellent stability and strength up to a temperature of about 212° F. The contacts are formed of a suitable spring wire, preferably of circular cross section, and may be of a nickel-silver composition having a diameter of approximately .0125 inch which will afford the optimum force against the coded card 11. The ends 59 of the contacts have a somewhat oval configuration to enlarge the surface area thereof in intimate contact with the coded card 11, and thus eliminate the possibility of the contact cutting a groove into the thin metallic (silver) pattern 16.

The contacts are freely deflectible within the grooves therefor since the grooves gradually increase in depth toward the slotted ends 47 thereof as shown in Figure 5. Thus, the contacts are supported for deflection at a point remote from the curved ends 59 thereof; and in a specific embodiment of the invention, the contacts are supported at a point .875 inch from the point of engagement of the curved end 59 with the coded card 11. Such contacts also had an angle of about 50° from the plane of the index plate 19. In certain environments, it is believed that the ideal working characteristics of the contacts will involve a deflection of approximately .070 inch, and that with such deflection the contacts will exert a force of approximately eight ounces against the coded card.

In use of the reader in the environment described, it will form a part of a composite structure and the printed wire panels 35, 36 and 37 will be permanently connected thereto and will define the appropriate electronic decoding arrangement necessarily used with the reader. The interconnection of the reader and panels will be permanent in the sense that it will not be necessary to remove the reader or, conversely, any of the panels therefrom except for maintenance purposes. The coded cards 11 are inserted into the reader beneath the index panel 19 from right to left as viewed in Figure 5. The contacts will be depressed or deflected by the insertion of the card, and in attempting to restore themselves to their original state will apply an upwardly directed frictional force against the pattern conductors 17 aligned therewith and thereby electrically connect the same to the printed circuit panels 35 through 37. The appropriate conductors 17 are properly aligned with the contacts 32 through 34 by indexing the card to the selected location with reference to the index indicia on the panel 19.

While in the foregoing specification an embodiment of the invention has been set forth in considerable detail for purposes of illustration, it will be apparent to those skilled in the art that numerous changes may be made in those details without departing from the principles and spirit of the invention.

We claim:

1. In reader apparatus of the character described, a plurality of contact blocks each having a plurality of spaced apart, parallel channels extending thereacross, a spring contact in each of said channels and being provided with a turned end portion extending outwardly therefrom, said contacts being deflectible within said channels to vary the position of the turned end portions thereof, said contacts adjacent the other ends thereof being adapted to engage the conductors of a printed wire panel to establish electrical connection therewith, means for securing said blocks to each other in juxtaposition with the channels thereof in overlying, parallel relation, and means for maintaining a coded card in position with respect to said contacts such that the contacts are deflected and thereby resiliently engage portions of the conductor pattern on the card.

2. In apparatus for reading coded cards and the like having electrical conductor patterns on a side thereof, a plurality of contact blocks of substantially similar configuration secured one to another in overlying juxtaposition, each of said blocks having a plurality of generally parallel channels formed therein, said channels being respectively aligned in overlying parallel relation from block to block, an elongated contact in each of said channels whereby a plurality of adjacent parallel rows thereof are provided, means securing each of said contacts within the channel therefor, said contacts each having an arcuate end portion for establishing connection with the conductor pattern of such card, and means for confining a coded card against the arcuate end portions of said contacts to effectuate an electrical connection of the conductor pattern thereof with the contacts.

3. In apparaus for reading coded cards and the like having an electrical conductor pattern on a side thereof, a plurality of contact blocks of substantially similar configuration secured one to another in overlying juxtaposition, each of said blocks having a plurality of generally parallel channels formed therein and terminating at each end in open slots, said channels of the respective blocks being oriented in overlying parallel alignment, a contact finger in each of said channels whereby a plurality of adjacent rows thereof are provided, each of said contact fingers having an arcuate end portion extending outwardly beyond the blocks for engagement with the conductor pattern on such coded card, said blocks adjacent the opposite ends of said contact fingers having spaced surfaces for receiving printed wire panels therebetween, and a friction knee provided by each of said contacts for engagement with the conductors on such printed wire panels.

4. The apparatus of claim 3 in which each of said channels increases in depth toward the arcuate ends of the contacts to afford relatively free deflection thereof.

5. The apparatus of claim 4 in which the respectively adjacent surfaces of the panel-receiving end portions of said contact blocks are angularly disposed with respect to each other to define a convergence of such panels toward said blocks.

6. In apparatus for reading coded cards and the like having an electrical conductor pattern on a side thereof, a plurality of contact blocks of substantially similar configuration secured one to another in overlying juxtaposition, each of said blocks having a plurality of generally parallel channels formed therein and terminating at each end in open slots, said channels of the respective blocks being oriented in overlying parallel relation, a contact finger in each of said channels whereby a plurality of adjacent rows thereof are provided, each of said contact fingers having an arcuate end portion extending beyond said blocks, and an indexing panel secured to said blocks in covering relation with the arcuate ends of said fingers whereby a coded card inserted thereunder is frictionally engaged by said contact fingers, each of said contact fingers being provided adjacent the opposite end thereof with a friction knee engageable with the conductors on a printed wire panel.

7. In apparatus for reading coded cards and the like having an electrical conductor pattern on a side thereof, a plurality of contact blocks of substantially similar configuration secured one to another in overlying juxtaposition, each of said blocks having a plurality of generally parallel channels formed therein terminating at each end in open slots, each block having also an elongated recess on one side thereof extending across said channels and an elongated rib on the other side thereof disposed in parallel relation with said recess and being seated within the recess of the block adjacent thereto, said recesses and ribs having an off-center interrupted portion intermediate the ends thereof to orient the blocks in a predetermined juxtaposition in which the channels thereof are in overlying parallel alignment, a contact finger in each of said channels whereby a plurality of adjacent parallel rows thereof are provided, each of said contact fingers having an arcuate end portion extending beyond said blocks, and an indexing panel secured to said blocks in covering relation with the arcuate ends of said fingers whereby a coded card inserted thereunder is frictionally engaged by said contact fingers, each of said contact fingers being provided adjacent the opposite end thereof with a friction knee engageable with the conductors on a printed wire panel.

8. The apparatus of claim 7 in which said arcuate end portions of the contact fingers have a generally oval configuration.

9. The apparatus of claim 7 in which each of said contact fingers has a bowed portion intermediate the ends thereof seated within the recess of the block therefor, and in which each contact is secured to the block within the recess thereof to facilitate assembly of the blocks one to another.

10. The apparatus of claim 7 in which said blocks have laterally turned longitudinal edge portions adjacent said friction knees adapted to receive printed wire panels between the adjacent surfaces thereof to effectuate the aforementioned engagement of said friction knees with the conductors of such panels.

11. The apparatus of claim 10 in which the respectively adjacent surfaces of the contact blocks are angularly oriented with respect to each other so that the printed wire panels received therebetween diverge from each other in a direction away from said blocks.

12. In apparatus of the character described, a contact block provided with a plurality of spaced apart, parallel channels extending thereacross, each of said channels terminating at the ends thereof in open slots, and each channel increasing in depth toward one end thereof, an elongated spring contact in each of said channels and being provided with a turned end portion adapted to engage a conductor pattern on a coded card, said turned end portion of each of said contacts being disposed in said portion of said channel having said increased depth thereby to afford relatively free deflection of the contact, means for pressing such coded card against the turned end portions of said contacts to deflect the same and thereby effect a frictional engagement between the contacts and a conductor pattern on the card, said contacts at the other ends thereof being disposed for connection with the conductors of an electric circuit.

References Cited in the file of this patent

UNITED STATES PATENTS

| | | |
|---|---|---|
| 1,521,591 | Beck | June 6, 1925 |
| 2,712,309 | Offner | July 5, 1955 |
| 2,813,935 | Bang | Nov. 19, 1957 |